United States Patent [19]

Sertich

[11] Patent Number: 5,111,654
[45] Date of Patent: May 12, 1992

[54] MOTIVE FORCE COMBUSTION PRODUCTS GENERATOR AND METHOD

[76] Inventor: Anthony T. Sertich, 137 MacIntyre Ln., Allendale, N.J. 07401

[21] Appl. No.: 663,416

[22] Filed: Mar. 1, 1991

Related U.S. Application Data

[63] Continuation-in-part of Ser. No. 396,364, Aug. 21, 1989, abandoned.

[51] Int. Cl.⁵ .................................................. F02C 5/06
[52] U.S. Cl. ....................................... 60/39.8; 60/39.76
[58] Field of Search ................ 60/39.44, 39.76, 39.78, 60/39.79.39.8

[56] References Cited

U.S. PATENT DOCUMENTS

| | | | |
|---|---|---|---|
| 727,067 | 5/1903 | Blake et al. | 60/39.76 |
| 1,731,778 | 10/1929 | Holzwarth | 60/39.79 |
| 2,566,730 | 9/1951 | Knight | 60/39.8 |
| 3,264,824 | 8/1966 | Bost | 60/39.8 |

*Primary Examiner*—Louis J. Casaregola
*Attorney, Agent, or Firm*—Samuelson & Jacob

[57] ABSTRACT

Apparatus and method for generating combustion products to be used to drive an engine converts a pressurized combustible mixture into combustion products in a combustion chamber, the combustion products being confined to the combustion chamber until the occurrence of a predetermined combustion condition in the combustion chamber, and then being released from confinement in the combustion chamber for conduct to the engine in response to the occurrence of the predetermined combustion condition in the combustion chamber, which predetermined combustion condition occurs when combustion of the combustible mixture essentially is complete, for maximizing fuel efficiency and minimizing the expulsion of pollutants from the combustion chamber.

21 Claims, 3 Drawing Sheets

MOTIVE FORCE COMBUSTION PRODUCTS GENERATOR AND METHOD

This is a continuation-in-part of application Ser. No. 396,364, filed Aug. 21, 1989, now abandoned.

The present invention relates generally to the provision of motive force for the operation of engines and pertains, more specifically, to apparatus and method for generating combustion products for driving engines.

Engines which operate on the motive force provided by the combustion products of combustible materials are a mainstay of the industrial age. Perhaps the most ubiquitous of these engines is the internal combustion engine which provides an effective source of power for a myriad of uses too extensive to enumerate here. However, lately the internal combustion engine has come under greater scrutiny in view of some of the undesirable characteristics of the engine, such as inordinate fuel consumption and the emission of pollutants.

It has been suggested that fuel efficiency and the emission of pollutants are related to incomplete combustion of the combustible mixtures to produce combustion products utilized for motive power in these engines. Accordingly, the present invention provides apparatus and method for generating combustion products used as the motive force for an engine with the objective of increasing fuel efficiency and decreasing the emission of pollutants. As such, the present invention attains several objects and advantages, some of which may be summarized as follows: Attains more complete combustion of fuel for more efficient conversion of energy used for driving an engine, with reduced pollutants; reduces the complexity of apparatus for converting a gaseous combustible mixture to combustion products for use in connection with driving an engine; produces reliable and effective apparatus and method for generating motive power for engines with increased efficiency and economy, utilizing commonly available fuels, with lowered emission of pollutants; enables effective operation with reliability over an extended service life.

The above objects and advantages, as well as further objects and advantages, are attained by the present invention which may be described briefly as apparatus and method for converting a pressurized gaseous combustible mixture from a source of such pressurized combustible mixture to combustion products which provide motive force to an engine driven by the combustion products, the apparatus and method comprising: means for and the step of admitting the pressurized combustible mixture to a combustion chamber to fill the combustion chamber with the pressurized combustible mixture; means for and the step of igniting the pressurized combustible mixture in the combustion chamber to convert the combustible mixture to combustion products; means for and the step of confining the combustion products within the combustion chamber until the occurrence of a predetermined combustion condition in the combustion chamber; and means for and the step of releasing the combustion products from confinement in the combustion chamber for conduct from the combustion chamber to the engine in response to the occurrence of the predetermined combustion condition. In a preferred embodiment of the invention, the combustion chamber has a variable volume such that upon admitting the pressurized combustible mixture to the combustion chamber, the volume of the combustion chamber is expanded from a minimum volume to a maximum volume and the invention includes means for and the step of contracting the volume of the combustion chamber toward the minimum volume, subsequent to releasing the combustion products from confinement in the combustion chamber, to assist in expelling the released combustion products from the combustion chamber.

The invention will be understood more fully, while still further objects and advantages will become apparent, in the following detailed description of preferred embodiments of the invention illustrated in the accompanying drawing, in which.

Figure 3:
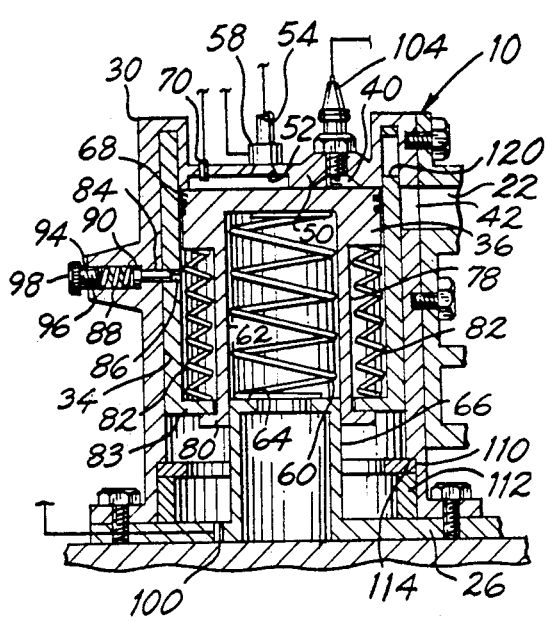
FIGS. 3 through 6 are cross-sectional views similar to a portion of FIG. 1 and illustrating the operation of apparatus and method of the invention.
Figure 5:
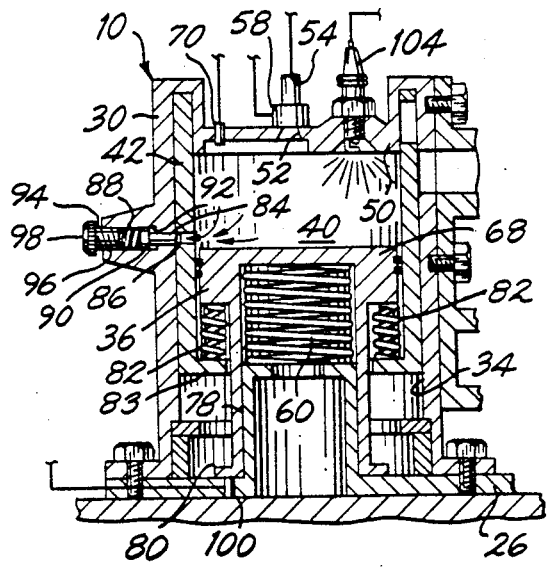
Figure 6:
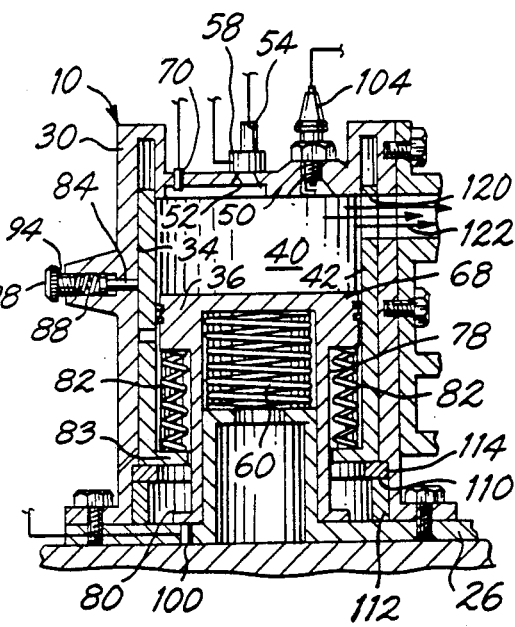
Figure 7:
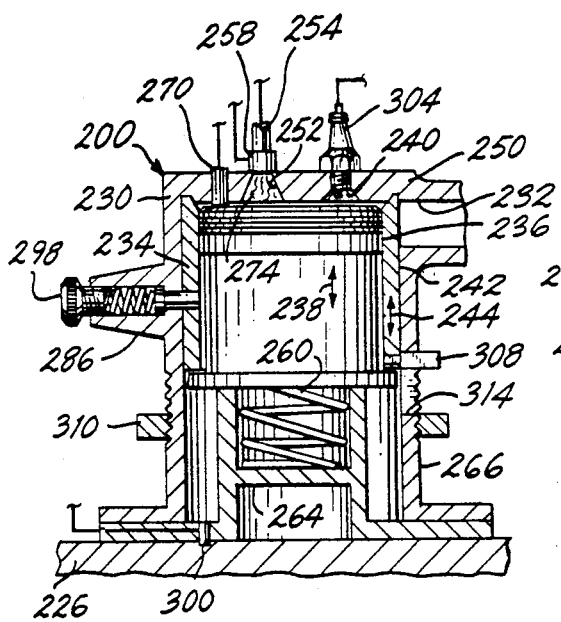
Figure 8:
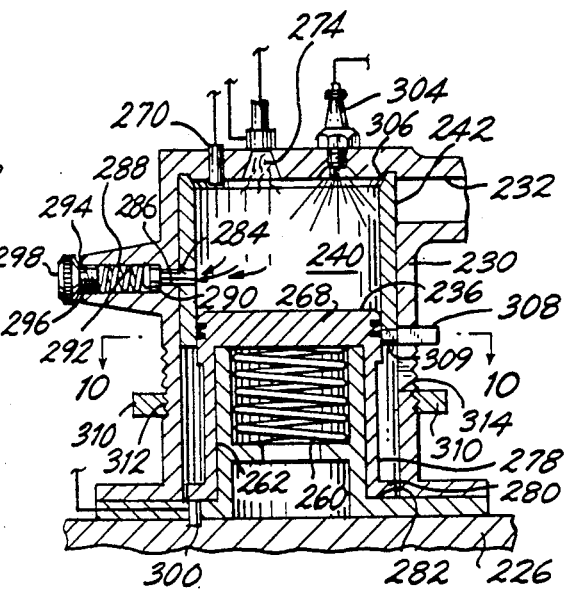
Figure 9:
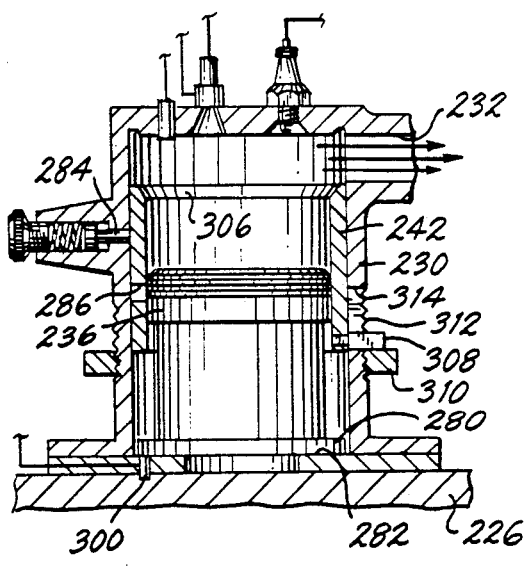
Figure 10:
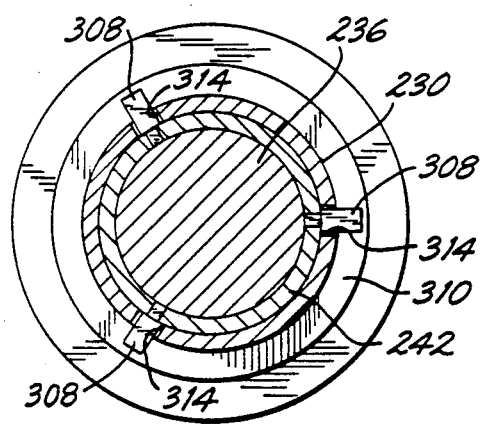

FIGS. 7 through 9 are cross-sectional views similar to FIGS. 3, 5 and 6, but illustrating another embodiment of the invention; and FIG. 10 is a cross-sectional view taken along line 10—10 of FIG. 8.

Figure 1:
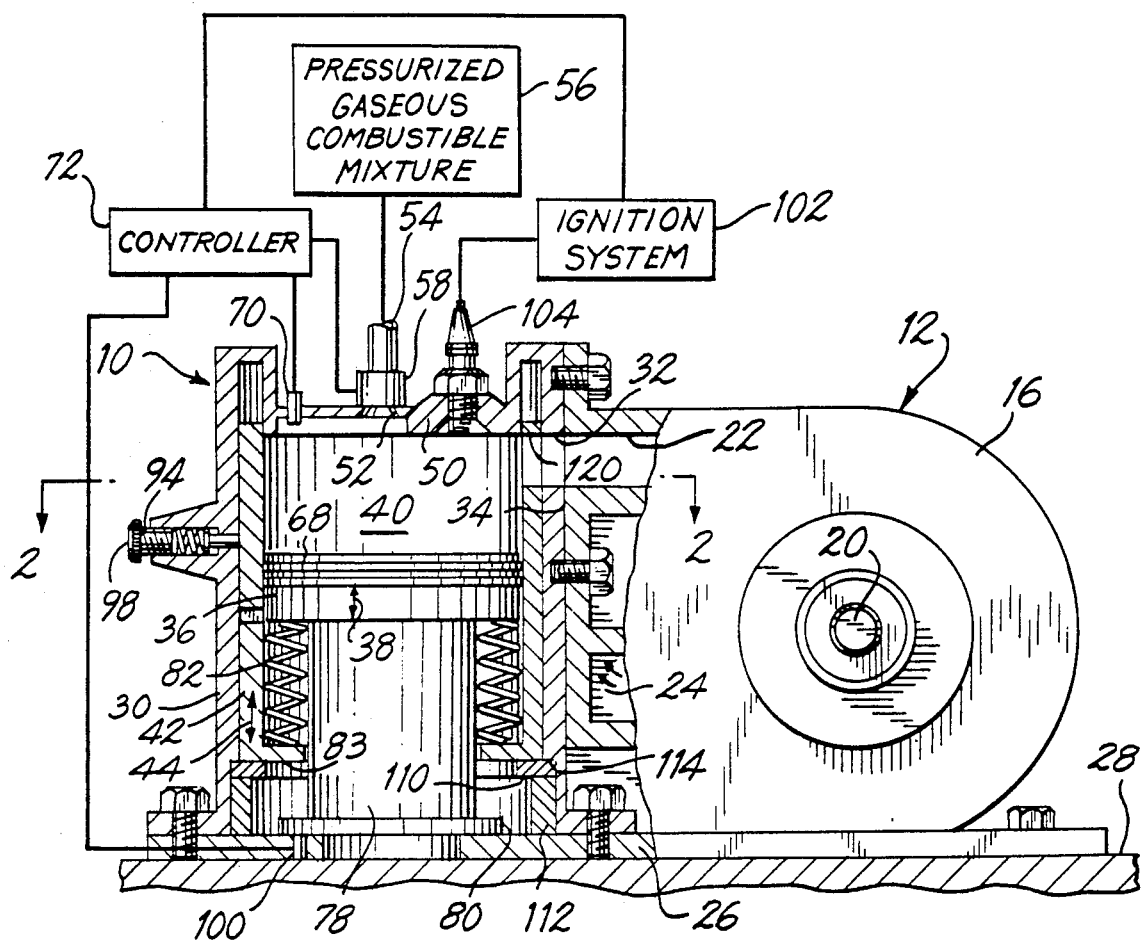
FIG. 1 is a partially diagrammatic, partially cross-sectioned view of an apparatus constructed in accordance with the invention shown operating an engine.
Figure 2:
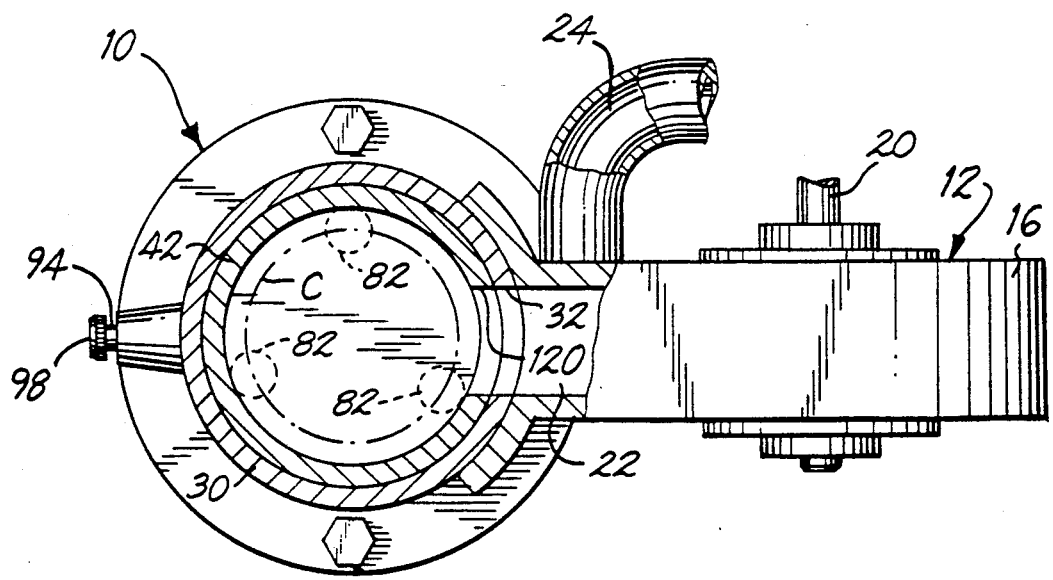
FIG. 2 is an elevational view, partially cross-sectioned along line 2—2 of FIG. 1.

Referring now to the drawing, and especially to FIGS. 1 and 2 thereof, an apparatus constructed in accordance with the invention is shown at 10 and is seen generating combustion products which provide motive force to an engine, illustrated in the form of a gas turbine 12, having a turbine housing 16, and providing power through an output shaft 20, all in a manner well known in the art of gas turbine construction. Gas turbine 12 has an inlet passage 22 for conducting motive fluid, here shown in the form of the combustion products, into the turbine housing 16 and an outlet passage 24 for carrying away expended motive fluid. A base 26 supports the gas turbine 12 upon a support surface 28 and preferably is bolted to the support surface 28.

Apparatus 10 includes a cylinder block 30 which, in the present illustrated embodiment, is bolted to the base 26 and to the turbine housing 16. An outlet passage 32 in the cylinder block 30 communicates with the inlet passage 22 of the gas turbine 12 and with a cylinder 34 in the cylinder block 30. A piston 36 is placed in the cylinder 34 and is arranged for reciprocating movement within the cylinder 34, as indicated by the arrow 38, to define a combustion chamber 40 of variable volume, as will be described in greater detail below. A generally cylindrical sleeve 42 is interposed between the piston 36 and the cylinder 34 and is slidable in upward and downward directions, as indicated by the arrow 44. A cylinder head 50 is shown integral with the cylinder block 30 and closes the top of the cylinder 34. An inlet 52 communicates with the cylinder 34 at the cylinder head 50 and is connected by means of a conduit 54 to a source 56 of pressurized gaseous combustible mixture, such as a combustible mixture of gasoline and air, and a first valve means, shown in the form of a valve 58, normally closes communication between the inlet 52 and the source 56.

Figure 4:
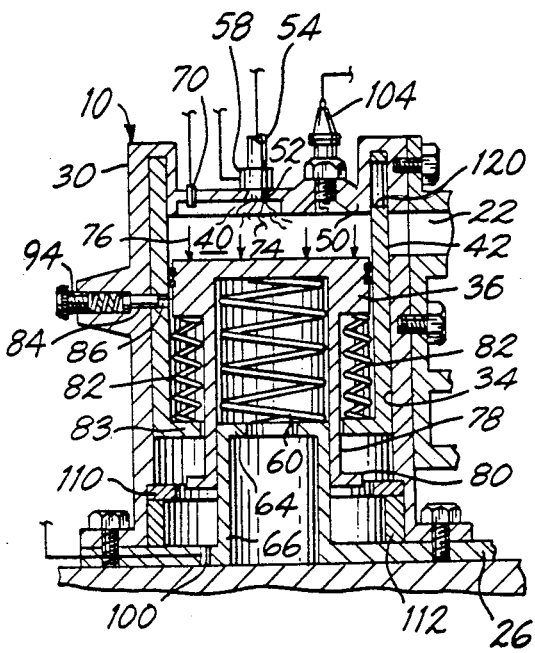

Turning now to FIG. 3, the piston 36 is shown at a first position wherein the piston 36 is located at the uppermost limit of travel within the cylinder 34 and the volume of the combustion chamber 40 is at a minimum. A helical coiled spring 60 extends within a bore 62 in the piston 36, between the top 64 of a post 66 which projects upwardly from the base 26 and the head 68 of the piston 36, to bias the piston 36 into the first position. A proximity detector 70 detects the presence of the piston 36 at the first position and signals a controller 72 (see FIG. 1) to open the valve 58, enabling pressurized combustible mixture 74 to enter the cylinder 34 and urge the piston 36 downwardly, as indicated by the arrows 76 in FIG. 4, into a second position thereof, illustrated in FIG. 5. In the second position of the piston 36, the combustion chamber 40 is at a maximum volume and the maximum volume of the combustion chamber 40 is filled with the pressurized combustible mixture 74. Helical coiled spring 60 is compressed and a skirt 78 which depends downwardly from the piston 36 carries a flange 80 which comes to rest against the base 26. At the same time, a plurality of helical coiled springs 82, which extend between the head 62 of the piston 36 and a radially-inwardly directed flange 83 at the bottom of the sleeve 42 and are located on a circle C (see FIG. 2) concentric with the piston 36, the cylinder 34 and the helical coiled spring 60, are compressed between the head 62 of the piston 36 and the flange 83 of the sleeve 42. Sleeve 42 is fixed against movement by latching means shown in the form of a latch 84 biased into a complementary opening 86 in the wall of the sleeve 42 by means of a helical spring 88 which urges a plunger 90, interposed between the latch 84 and the helical spring 88 and slidable radially inwardly toward the sleeve 42 within a bore 92 extending radially within the cylinder block 30. Helical spring 88 is contained within the bore 92 and an adjuster 94 is threaded into the bore 92 at 96 and includes an adjustment knob 98 enabling selection of the biasing force with which the latch 84 is urged into the complementary opening 86, for purposes which will be explained in detail below.

A second proximity detector 100 detects the presence of the flange 80 at the base 26 and transmits a signal to controller 72 and, in response to that signal, controller 72 closes valve 58 and activates ignition means in the form of an ignition system 102 (see FIG. 1) including an igniter illustrated in the form of spark plug 104 threaded into the cylinder head 50 to ignite the charge of combustible mixture 74 confined within the combustion chamber 40. The charge of combustible mixture 74 then burns to generate combustion products which likewise are confined to the combustion chamber 40 until the pressure in the combustion chamber 40 is raised sufficiently to urge plunger 90 radially outwardly against the biasing force of the helical spring 88 and move the latch 84 out of the opening 86, as illustrated in FIG. 5, whereupon the helical coiled springs 82 will move the sleeve 42 downwardly to the location illustrated in FIG. 6. Upon downward movement of the sleeve 42 to the location shown in FIG. 6, the sleeve 42 abuts a stop ring 110 which is affixed in the cylinder block 30 by means of a retainer 112 secured between the base 26 and a shoulder 114 in the cylinder block 30. A port 120 in the wall of the sleeve 42 thus is brought into registration with the outlet passage 32 in the cylinder block 30 so that the combustion chamber 40 is in direct communication with passage 22 in the housing 16 of the gas turbine 12 and the combustion products generated in the combustion chamber 40 are released from confinement in the combustion chamber 40 for conduct to the turbine 14, as seen at 122, for driving the gas turbine 12. In this manner, sleeve 42 serves as valve means for confining the combustion products to the combustion chamber 40, and helical coiled springs 82 serve as valve energy storage means for moving the valve means from the closed condition illustrated in FIG. 3 to the open condition illustrated in FIG. 6. Once the pressure in the combustion chamber 40 drops below that which will maintain the piston 36 in the lowered second position, the helical coiled spring 60, which serves as a piston energy storage means, will move the piston 36 upwardly toward the first position, thereby assisting in the expulsion of the combustion products from the combustion chamber 40 and returning the piston 36 to the first position. As the piston 36 returns to the first position, the flange 80 of the piston 36 engages the flange 83 on the sleeve 42, to couple the piston 36 with the sleeve 42, and moves the sleeve 42 upwardly to return the sleeve 42 to the upper location illustrated in FIG. 3, where the latch 84 once again enters the opening 86 to hold the sleeve 42 in place, with the wall of the sleeve 42 once again serving as valve means closing communication between the combustion chamber 40 and the outlet passage 32 in the cylinder block 30, and consequently, the passage 22 in the housing 16 of the gas turbine 12. The entire cycle is then ready to be repeated.

As described above, the containment of the combustible mixture as the combustion products are generated in the combustion chamber 40 is continued until a predetermined combustion condition occurs in the combustion chamber 40, the predetermined combustion condition being indicative of essentially complete burning of the fuel in the charge of combustible mixture in the combustion chamber. In the present illustrated embodiment, the predetermined combustion condition is a pressure sufficient to unlatch the sleeve 42. Thus, the adjuster 94 enables selection of a pressure which assures that the sleeve 42 is not unlatched, and the combustion products are not released, until essentially complete burning of the combustible mixture is effected, thereby assuring maximum efficiency in the use of the fuel for the combustible mixture and minimizing pollutants discharged from the combustion chamber 40. While in the present illustrated embodiment the occurrence of the predetermined combustion condition which accomplishes a maximization of fuel efficiency and a minimization of pollutant emission is a prescribed pressure in the combustion chamber 40, another predetermined combustion condition in the combustion chamber may be utilized as an indication of essentially complete burning and detected for operation of the latching means to unlatch the sleeve 42. For example, the presence of a prescribed temperature in the combustion chamber 40 can be detected and utilized as the predetermined combustion condition. In such an arrangement, the latching means which latches the sleeve 42 in the location where the valve provided by port 120 is in the closed condition, as illustrated in FIG. 3, would be responsive to temperature in the combustion chamber 40, instead of pressure, to unlatch the sleeve 42 for movement to the location where the valve provided by port 120 is in the open condition, as illustrated in FIG. 6.

In an alternate embodiment illustrated in FIGS. 7 through 10, apparatus 200 includes a cylinder block 230 which, in the present illustrated embodiment, is affixed to a base 226. An outlet passage 232 in the cylinder block 230 communicates with the inlet passage of a gas turbine (not shown) and with a cylinder 234 in the cylinder block 230. A piston 236 is placed in the cylinder 234 and is arranged for reciprocating movement within the cylinder 234, as indicated by the arrow 238, to define a combustion chamber 240 of variable volume, as will be described in greater detail below. A generally cylindrical sleeve 242 is interposed between the piston 236 and the cylinder 234 and is slidable in upward and downward directions, as indicated by the arrow 244. A cylinder head 250 is shown integral with the cylinder block 230 and closes the top of the cylinder 234. An inlet 252 communicates with the cylinder 234 at the cylinder head 250 and is connected by means of a conduit 254 to a source of pressurized gaseous combustible mixture, such as a combustible mixture of gasoline and air, and a first valve means, shown in the form of a valve 258, normally closes communication between the inlet 252 and the source of pressurized combustible mixture, all as described above in connection with the embodiment of FIGS. 1 through 6.

In FIG. 7, the piston 236 is shown at a first position wherein the piston 236 is located at the uppermost limit of travel within the cylinder 234 and the volume of the combustion chamber 240 is at a minimum. A helical coiled spring 260 extends within a bore 262 in the piston 236, between a web 264 of a post 266, which projects upwardly from the base 226, and the head 268 of the piston 236, to bias the piston 236 into the first position. A proximity detector 270 detects the presence of the piston 236 at the first position and signals a controller to open the valve 258, as described above in connection with the embodiment of FIGS. 1 through 6, enabling pressurized combustible mixture 274 to enter the cylinder 234 and urge the piston 236 downwardly into a second position thereof, illustrated in FIG. 8. In the second position of the piston 236, the combustion chamber 240 is at a maximum volume and the maximum volume of the combustion chamber 240 is filled with the pressurized combustible mixture 274. Helical coiled spring 260 is compressed and a skirt 278 which depends downwardly from the piston 236 carries a flange 280 which comes to rest against a basal portion 282 of post 266. Sleeve 242 is fixed against movement by latching means shown in the form of a latch 284 biased into a complementary opening 286 in the wall of the sleeve 242 by means of a helical spring 288 which urges a plunger 290, interposed between the latch 284 and the helical spring 288 and slidable radially inwardly toward the sleeve 242 within a bore 292 extending radially within the cylinder block 230. Helical spring 288 is contained within the bore 292 and an adjuster 294 is threaded into the bore 292 at 296 and includes an adjustment knob 298 enabling selection of the biasing force with which the latch 284 is urged into the complementary opening 286, for purposes which will be explained in detail below.

A second proximity detector 300 detects the presence of the flange 280 at the basal portion 282 and transmits a signal to close valve 258 and to activate ignition means including an igniter illustrated in the form of spark plug 304 threaded into the cylinder head 250 to ignite the charge of combustible mixture 274 confined within the combustion chamber 240, all as described above in connection with the embodiment of FIGS. 1 through 6. The charge of combustible mixture 274 then burns to generate combustion products which likewise are confined to the combustion chamber 240 until the pressure in the combustion chamber 240 is raised sufficiently to urge plunger 290 radially outwardly against the biasing force of the helical spring 288 and move the latch 284 out of the opening 286, as illustrated in FIG. 9, whereupon the elevated pressure within the combustion chamber 240 acting upon the upper surface 306 of sleeve 242 will move the sleeve 242 downwardly to the location illustrated in FIG. 9. Thus, upper surface 306 serves as a drive means responsive to the pressure in the combustion chamber to move the sleeve 242 to the open condition to release the combustion products for conduct to the gas turbine. To this end, upper surface 306 of sleeve 242 is chamfered to assure that the elevated pressure in combustion chamber 240 will establish a downward force on sleeve 242 sufficient to move the sleeve 242 downwardly to the second location illustrated in FIG. 9. Upon downward movement of the sleeve 242 to the location shown in FIG. 9, stop pins 308 carried by the sleeve 242 adjacent the lowermost end 309 of the sleeve 242 abut a stop ring 310 which is secured to the cylinder block 230 by means of a threaded connection 312 established along the cylinder block 230. Stop pins 308 extend radially outwardly through corresponding slots 314 in the cylinder block 230, as seen also in FIG. 10. The wall of the sleeve 242 thus is displaced downwardly to open communication between the outlet passage 232 in the cylinder block 230 and combustion chamber 240 so that the combustion chamber 240 is in direct communication with the gas turbine and the combustion products generated in the combustion chamber 240 are released from confinement in the combustion chamber 240 for conduct to the gas turbine, for driving the gas turbine, all as described above in connection with the embodiment of FIGS. 1 through 6. In this manner, sleeve 242 serves as valve means for confining the combustion products to the combustion chamber 240. Once the pressure in the combustion chamber 240 drops below that which will maintain the piston 236 in the lowered second position, the helical coiled spring 260, which serves as a piston energy storage means, will move the piston 236 upwardly toward the first position, thereby assisting in the expulsion of the combustion products from the combustion chamber 240 and returning the piston 236 to the first position. As the piston 236 returns to the first position, the flange 280 of the piston 236 engages the sleeve 242, at the lowermost end 309 of the sleeve 242, to couple the piston 236 with the sleeve 242, and moves the sleeve 242 upwardly to return the sleeve 242 to the upper location illustrated in FIG. 7, where the latch 284 once again enters the opening 286 to hold the sleeve 242 in place, with the wall of the sleeve 242 once again serving as valve means closing communication between the combustion chamber 240 and the outlet passage 232 in the cylinder block 230, and consequently, the passage to the gas turbine. The entire cycle is then ready to be repeated.

The limit of downward displacement of the sleeve 242 is determined by the location of the stop ring 310 on the cylinder block 230. The threaded connection 312 enables selective positioning of the stop ring 310 for setting the position of the second location of sleeve 242. In this manner, the threaded connection 312 serves as means for selecting the second location of the sleeve 242 relative to the outlet passage 232 so that the communication between the combustion chamber 240 and the gas turbine may be adjusted by either partially or fully opening that communication for throttling purposes.

It will be seen that the present invention provides apparatus and method for generating combustion products used as the motive force for an engine with the objective of increasing fuel efficiency and decreasing the emission of pollutants, and as such, attains several objects and advantages, some of which may be summarized as follows: Attains more complete combustion of fuel for more efficient conversion of energy used for driving an engine, with reduced pollutants; reduces the complexity of apparatus for converting a gaseous combustible mixture to combustion products for use in connection with driving an engine; produces reliable and effective apparatus and method for generating motive power for engines with increased efficiency and economy, utilizing commonly available fuels, with lowered emission of pollutants; enables effective operation with reliability over an extended service life.

It is to be understood that the above detailed description of preferred embodiments of the invention are provided by way of example only. Various details of design, construction and operation may be modified without departing from the true spirit and scope of the invention as set forth in the appended claims.

The embodiments of the invention in which an exclusive property or privilege is claimed are defined as follows:

1. A combustion products generator for converting a pressurized gaseous combustible mixture from a source of such pressurized combustible mixture to combustion products which provide motive force to an engine driven by the combustion products, the combustion products generator comprising:
   a cylinder;
   a piston arrange for reciprocating movement within the cylinder to define a combustion chamber of variable volume, the piston being movable relative to the cylinder between a first position, wherein the volume of the combustion chamber is at a minimum, and a second position, wherein the volume of the combustion chamber is at a maximum;
   first valve means between the source of the pressurized combustible mixture and the cylinder for admitting to the cylinder the pressurized combustible mixture such that the piston is driven by the pressurized combustible mixture from the first position toward the second position, and the maximum volume of the combustion chamber is filled with the pressurized combustible mixture;
   ignition means for igniting the pressurized combustible mixture in the combustion chamber;
   second valve means between the cylinder and the engine and movable between a closed condition, wherein the combustion products are confined to the combustion chamber, and an open condition, wherein the combustion products are released for conduct from the combustion chamber to the engine, the second valve means including valve-operating means for normally maintaining the second valve means in the closed condition, the valve-operating means being responsive to a predetermined combustion condition in the combustion chamber to move the second valve means to the open condition in response to the occurrence of the predetermined combustion condition;
   return means for returning the piston to the first position subsequent to movement of the second valve means to the open condition; and
   piston responsive means for returning the second valve mans to the closed condition in response to return of the piston from the second position to the first position, the piston responsive means including coupling means for coupling the piston with the second valve means such that upon return movement of the piston from the second position to the first position the second valve means is returned to the closed condition;
   the valve-operating means including latching means normally latching the second valve means in the closed condition, the latching means being responsive to the predetermined combustion condition to unlatch the second valve means in response to the occurrence of the combustion condition.

2. The invention of claim 1 wherein the predetermined combustion condition is a selected pressure in the combustion chamber and the latching means includes pressure-responsive means responsive to the selected pressure to unlatch the second valve means.

3. The invention of claim 1 wherein the ignition means includes igniting means for igniting the pressurized combustible mixture in the combustion chamber when the piston is in the second position.

4. The invention of claim 1 including valve energy storage means coupling the piston with the second valve means such that upon movement of the piston from the first position to the second position energy is stored in the valve energy storage means and upon unlatching of the second valve means the energy stored in the valve energy storage means moves the second valve means to the open condition to release the combustion products for conduct to the engine.

5. The invention of claim 4 wherein the predetermined combustion condition is a selected pressure in the combustion chamber and the latching means includes pressure-responsive means responsive to the selected pressure to unlatch the second valve means.

6. The invention of claim 4 including a passage between the cylinder and the engine for conducting the combustion products from the combustion chamber to the engine, and wherein the second valve means includes a sleeve between the cylinder and the piston, and a port in the sleeve, the sleeve being slidable between a first location, wherein the sleeve closes communication between the combustion chamber and the engine when the second valve means is in the closed condition, and a second location wherein the port is registered with the passage for opening communication between the combustion chamber and the engine when the second valve means is in the open condition.

7. The invention of claim 6 wherein the predetermined combustion condition is a selected pressure in the combustion chamber and the latching means includes a latch, and biasing means for biasing the latch into latching engagement with the sleeve, when the sleeve is in the first location, to maintain the sleeve in the first location, the biasing means including pressure-responsive means responsive to the pressure in the combustion chamber for moving the latch out of latching engagement with the sleeve upon the occurrence of the selected pressure in the combustion chamber.

8. The invention of claim 7 wherein the valve energy storage means includes a spring between the piston and the sleeve.

9. The invention of claim 1 wherein the return means includes piston energy storage means coupled with the piston such that upon movement of the piston from the first position to the second position energy is stored in the piston energy storage means, and upon release of the combustion products for conduct to the engine the energy stored in the piston energy storage means returns the piston to the first position and assists in expelling the combustion products from the cylinder.

10. The invention of claim 9 including valve energy storage means coupling the piston with the second valve means such that upon movement of the piston from the first position to the second position energy is stored in the valve energy storage means and upon unlatching of the second valve means the energy stored in the valve energy storage means moves the second valve means to the open condition to release the combustion product for conduct to the engine.

11. The invention of claim 10 including a passage between the cylinder and the engine for conducting the combustion products from the combustion chamber to the engine, and wherein the second valve means includes a sleeve between the cylinder and the piston, and a port in the sleeve, the sleeve being slidable between a first location, wherein the sleeve closes communication between the combustion chamber and the engine when the second valve means is in the closed condition, and a second location wherein the port is registered with the passage for opening communication between the combustion chamber and the engine when the second valve means is in the open condition.

12. The invention of claim 11 wherein the predetermined combustion condition is a selected pressure in the combustion chamber and the latching means includes a latch, and biasing means for biasing the latch into latching engagement with the sleeve, when the sleeve is in the first location, to maintain the sleeve in the first location, the biasing means including pressure-responsive means responsive to the pressure in the combustion chamber for moving the latch out of latching engagement with the sleeve upon the occurrence of the selected pressure in the combustion chamber.

13. The invention of claim 12 wherein the valve energy storage means includes first spring means between the piston and the sleeve biasing the sleeve into the second location, and the piston energy storage means includes second spring means coupled with the piston and biasing the piston toward the first position.

14. The invention of claim 13 wherein the first spring means includes a plurality of first helical coiled springs, and the second spring means includes a second helical coiled spring, the first helical coiled springs being located along a circle concentric with the first helical coiled spring, and the second helical coiled spring being concentric with the piston, the sleeve and the cylinder.

15. The invention of claim 13 wherein the piston includes engaging means for engaging the sleeve as the piston moves from the second position to the first position to move the sleeve from the second location to the first location.

16. The invention of claim 12 wherein the ignition means includes igniting means for igniting the pressurized combustible mixture in the combustion chamber when the piston is in the second position.

17. The invention of claim 1 including valve drive means responsive to the pressure in the combustion chamber to move the second valve means to the open condition to release the combustion products for conduct to the engine.

18. The invention of claim 17 wherein the predetermined combustion condition is a selected pressure in the combustion chamber and the latching means includes pressure-responsive means responsive to the selected pressure to unlatch the second valve means.

19. The invention of claim 17 including a passage between the cylinder and the engine for conducting the combustion products from the combustion chamber to the engine, and wherein the second valve means includes a sleeve between the cylinder and the piston, the sleeve being slidable between the first location, wherein the sleeve closes communication between the combustion chamber and the engine when the second valve means is in the closed condition, and a second location wherein the sleeve is displaced relative to the passage for opening communication between the combustion chamber and the engine when the second valve means is in the open condition.

20. The invention of claim 19 wherein the predetermined combustion condition is a selected pressure in the combustion chamber and the latching means includes a latch, and biasing means for biasing the latch into latching engagement with the sleeve, when the sleeve is in the first location, to maintain the sleeve in the first location, the biasing means including pressure-responsive means responsive to the pressure in the combustion chamber for moving the latch out of latching engagement with the sleeve upon the occurrence of the selected pressure in the combustion chamber.

21. The invention of claim 19 including selective means for selecting the position of the second location of the sleeve, and consequently the position of the sleeve relative to the passage when the sleeve is in the second position.

* * * * *